United States Patent
Lakshmanan et al.

(10) Patent No.: US 10,970,795 B2
(45) Date of Patent: Apr. 6, 2021

(54) ANSWER SUPPORT SYSTEMS FOR HYBRID NETWORKS

(71) Applicant: International Business Machines Corporation, Armonk, NY (US)

(72) Inventors: Geetika T Lakshmanan, Winchester, MA (US); Clifford A Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 14/502,710

(22) Filed: Sep. 30, 2014

(65) Prior Publication Data

US 2016/0092775 A1 Mar. 31, 2016

(51) Int. Cl.

| G06F 17/00 | (2019.01) |
|---|---|
| G06F 17/20 | (2006.01) |
| G06Q 50/00 | (2012.01) |
| G06Q 30/02 | (2012.01) |
| G06N 5/04 | (2006.01) |

(52) U.S. Cl.
CPC ............... *G06Q 50/01* (2013.01); *G06N 5/04* (2013.01); *G06Q 30/0202* (2013.01); *G06N 5/043* (2013.01)

(58) Field of Classification Search
CPC ...... G06N 5/04; G06N 5/043; G06N 30/0202; G06Q 50/01; H04L 67/22; H04L 67/24; G10L 15/1822; H04M 3/4936; Y10S 707/99934

See application file for complete search history.

(56) References Cited

U.S. PATENT DOCUMENTS

| 7,562,009 B1* | 7/2009 | Emerson | G06F 17/27 |
| | | | 704/9 |
| 7,809,664 B2 | 10/2010 | Heck | |
| 8,775,275 B1* | 7/2014 | Pope | G06Q 30/0641 |
| | | | 705/14.49 |
| 9,251,185 B2* | 2/2016 | Kumar | G06F 16/215 |
| 2002/0156629 A1* | 10/2002 | Carberry | G10L 15/1822 |
| | | | 704/257 |
| 2005/0125376 A1* | 6/2005 | Curtis | G06F 16/9535 |
| | | | 707/999.001 |
| 2011/0202533 A1 | 8/2011 | Wang et al. | |
| 2011/0252011 A1* | 10/2011 | Morris | H04L 51/32 |
| | | | 707/706 |
| 2012/0005148 A1* | 1/2012 | Horvitz | G06N 5/043 |
| | | | 706/50 |

(Continued)

OTHER PUBLICATIONS

Fidelman, Mark, "IBM's Watson Set to Revolutionize Marketing," http://www.forbes.com/sites/markfidelman/2013/09/04/ibms-watson-set-to-revolutionize-marketing/, Sep. 4, 2013, pp. 1-3.

(Continued)

*Primary Examiner* — Luis A Sitiriche
(74) *Attorney, Agent, or Firm* — Anthony Curro; Otterstedt, Wallace & Kammer, LLP

(57) ABSTRACT

A method of inferring intent in a hybrid network includes monitoring communications in the hybrid network between a plurality of members, triggering an estimation of an intent of one or more members of the hybrid network, estimating the intent, determining a confidence level of the intent, and triggering an action based on the confidence level.

20 Claims, 3 Drawing Sheets

(56) References Cited

U.S. PATENT DOCUMENTS

2013/0262501 A1    9/2013  Kuchmann-Beauger et al.
2015/0006242 A1*   1/2015  Bhasin .................. G06Q 50/01
                                                      705/7.29

OTHER PUBLICATIONS

Doian, Brian, "IBM's Watson Fund Invests in health Social network WellTok" http://mobihealthnews.com/29906/ibms-watson-fund-invests-in-health-social-network-welltok/, Feb. 12, 2014, pp. 1-2.
Fidelman, Mark, "10 Things IBM is Teaching the World About Winning in the Next Decade" http://www.forbes.com/sites/markfidelman/2013/06/13/10-things-ibm-is-teaching-the-world-about-winning-in-the-next-decade/2/, pp. -15, Jun. 13, 2013.

* cited by examiner

ANSWER SUPPORT SYSTEMS FOR HYBRID NETWORKS

BACKGROUND

The present disclosure relates to artificial intelligence (AI), and more particularly to a social prosthetic system (SPS) configured to infer the intent of members thereof.

With the advances in cognitive technology, humans and AI agents (e.g., question answering devices, statistics-based answer selection engines, etc.) are forming hybrid social networks. These hybrid social networks have created new environments for data extraction.

BRIEF SUMMARY

According to an exemplary embodiment of the present disclosure, a method of inferring intent in a hybrid network includes monitoring commutations in the hybrid network between a plurality of members, triggering an estimation of an intent of one or more members of the hybrid network, estimating the intent, determining a confidence level of the intent, and triggering an action based on the confidence level.

According to an exemplary embodiment of the present disclosure, a system includes a hybrid network comprising a plurality of members, and a social prosthetic system monitor monitoring communications between the members of the hybrid network and triggering an estimation of an intent of one or more members of the hybrid network, estimating the intent and determining a confidence level of the intent, and triggering an action based on the confidence level.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present invention, a social prosthetic system (SPS) and method are configured for determining the intent of members of a hybrid network or the intent of the hybrid network as a whole, and using the intent in one or more applications. The members of the hybrid network can include human users, artificial intelligence (AI) agents, and hybrid networks comprising amalgamations of users and AI agents.

Figure 1:
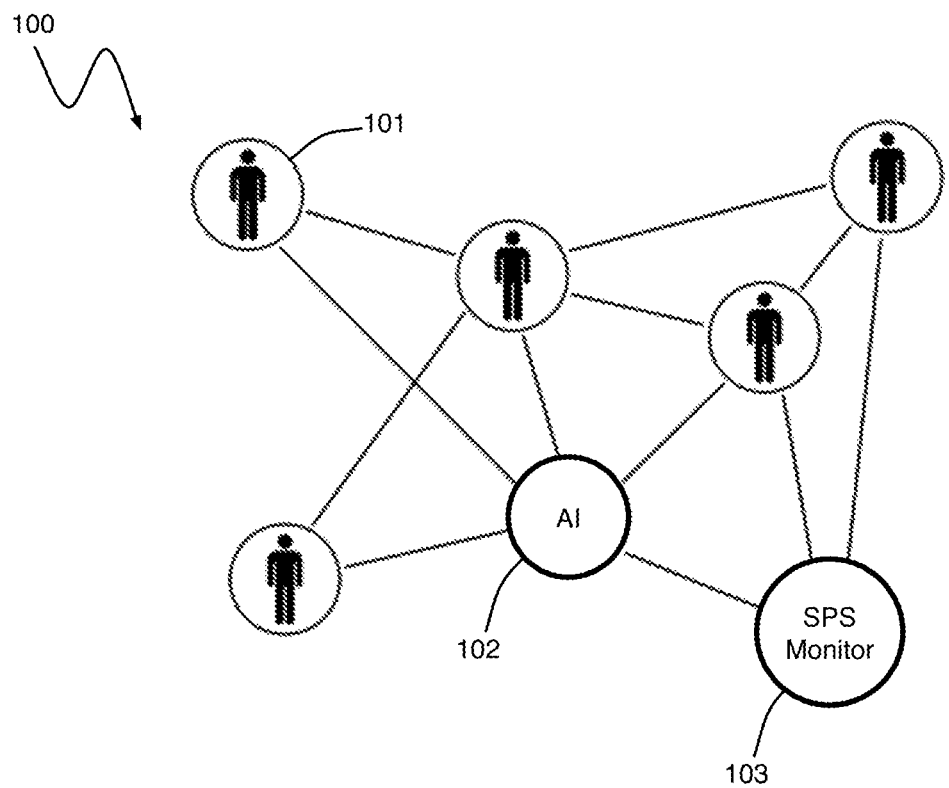
FIG. 1 illustrates a social prosthetic system according to an embodiment of the present invention.
Figure 2:
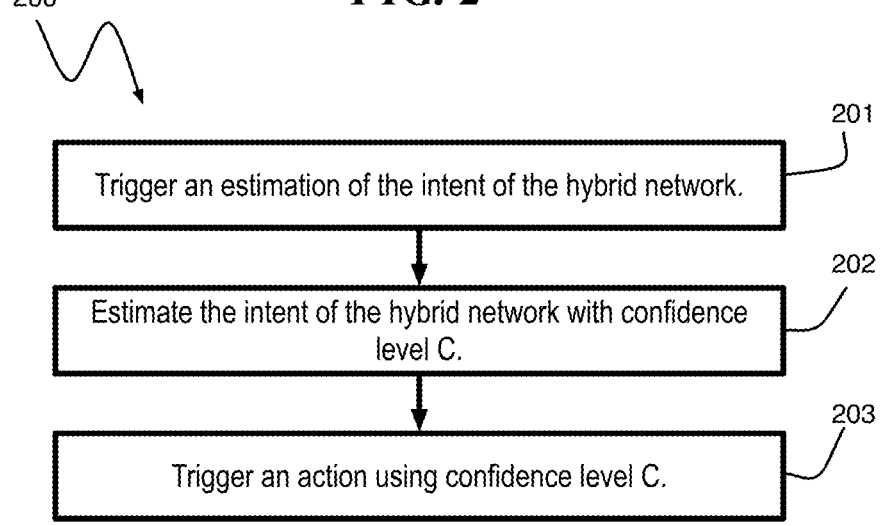
FIG. 2 is a flow diagram of a method of a social prosthetic system according to an embodiment of the present invention.

An exemplary architecture configured according to an embodiment of the present invention includes an SPS (see 100, FIG. 1) formed of a hybrid network having at least one user (e.g., 101) and an AI agent 102, and a SPS monitor 103. According to an embodiment of the present invention, the SPS monitor 103 performs a method (see 200, FIG. 2) including triggering an estimation of an intent of the hybrid network 201 (or members thereof), estimating the intent and a corresponding confidence level C 202, and triggering an action using confidence level C 203. It should be understood that the SPS monitor 103 can be an AI agent configured to determine intent, and can be implemented by a user device.

According to an embodiment of the present invention, the SPS 100 employs a set of AI systems and various user interfaces to engage with the user (e.g., gesture, haptic, and other sensory input).

Within the SPS the users work with the AI agents in a collaborative way, where for example, the AI agents are systems with natural language processing (NLP) capabilities. According to an embodiment of the present invention, the AI agents can be disposed on machines in a cloud, network devices shared by one or more users, local devices belonging to a particular user, portable devices, etc. The portable devices can include a smartphone, one or more devices integrated in a vehicle, a smart watch, a head-mounted display unit, etc. The SPS monitor 103 can be implemented by an AI agent and/or user device.

According to an embodiment of the present invention, the intent of a user, a group of users, or an amalgam of users and AI agents is a prediction of an action, output or outcome. Embodiments of the present invention can be applied to infer the intent of users and AI devices, discover relationships and hierarchies among different intents (e.g. as between an intent to arrive at a location on time, easily finding a parking spot, getting a drink/snack before an important event, switching off the cellphone), and resolving competing intents (e.g., identification of cost-optimal trajectory in achieving each). In another exemplary embodiment, intent can include a prediction of an output of the AI agent (or social network), before the AI agent has generated the output.

According to an embodiment of the present invention, the AI agent is a natural language question and answer (Q&A) system that answers natural language questions by querying data repositories and applying elements of language processing, information retrieval, and machine learning to arrive at a response to a user's query. In this embodiment, the SPS monitor 103 is configured to augment or enhanced the Q&A system (such as a DeepQA system). Specifically, according to one or more embodiments of the present invention, the SPS monitor 103 enhances responses of the Q&A system so that any output information or responses has a higher confidence (e.g., are more useful, relevant and/or probative) than that developed by the Q&A system alone. This enhancement can be accomplished using methods and/or components that are automatically triggered and performed by the SPS monitor 103, for example, based on keywords in a query, the location of a user or multiple users in the hybrid network, or other parameters. According to one or more embodiments of the present invention triggering the estimation of the intent 201 uses a parameter of the user such as a user's location, mood, current activity, social network connections, current context (e.g., who is the user with), etc.

According to an embodiment of the present invention, the trigger at 201 is an estimated cost of obtaining an AI agent's output. For example, a cost is estimated to be high if the AI agent needs access to expensive processor cycles (e.g., such as during a time of high processor demand) and large databases, tending to result in delayed output (e.g., an answer to a query). In the case of a high estimated cost, the intent of the AI agent can be estimated 202 by the SPS monitor 103 before the AI agent can arrive at a conclusion. In this example, the triggered action 203 can be outputting the estimated intent with the confidence level C parameterized for speed.

Figure 3:
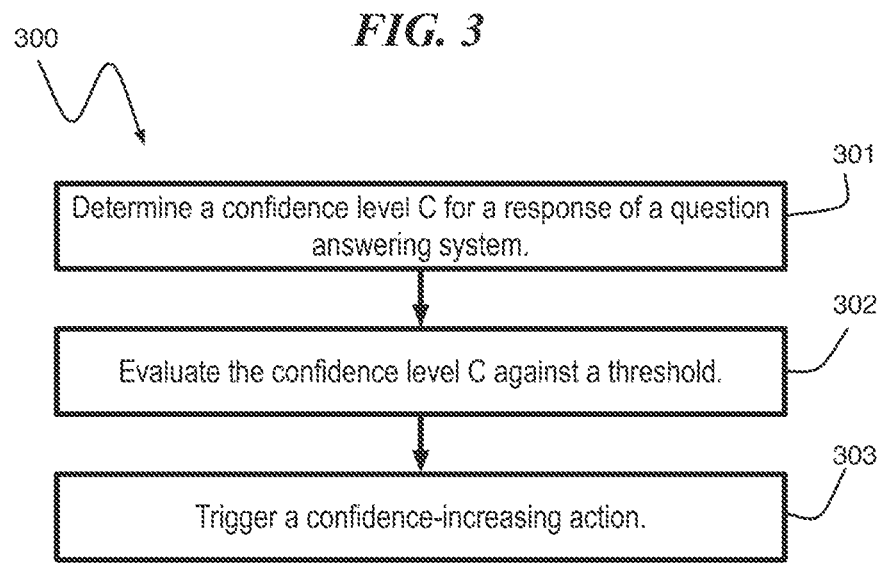
FIG. 3 is a flow diagram of a method of a social prosthetic system according to an embodiment of the present invention.

According to an embodiment of the present invention, a method (300, FIG. 3) implemented by the SPS monitor 103 for inferring intent makes use of natural language Q&A methods to determine a confidence level C of one or more responses (output by an AI agent) to a query 301 (presented by a user). The SPS monitor 103 triggers a confidence-increasing action 303 when the confidence level is below a threshold 302. The confidence-increasing action can include, for example, an analysis of content, users, and relationships in a social network to improve the response. According to an embodiment of the present invention, at block 303 the method updates the response to the query using the confidence-increasing action.

Determining Intent:

The intent of the hybrid network includes the intent of members of a social network. The intent can be determined in different forms. For example, a prediction of the outcome of an AI assessment can be made before the AI agent has had time to arrive at a conclusion. An estimation of the degree to which members of a social network affect one another may be made (e.g. a close advisor can be determined based on a volume of communication exchanged with the user). An estimation of intent can be based on parameters indicating connections within a social network and between its members.

According to an embodiment of the present invention, predicting intent can include a spatio-temporal dimension. For example, a group of people are intending to board a flight, and one member intends to purchase food items and accessories, and this intent is affected by the other members of the group, as well as information gleaned from the one member's mobile device. The intent of purchase is relevant within a period of time and space (for example, the member cannot purchase items once the flight has departed and cannot purchase the items when the member is no longer near the airport shops). According to an embodiment of the present invention, the system of predicting intent takes into account this spatio-temporal dimension of intent, and makes predictions of intent that are valid within a given time interval and are valid given location or availability of a resource (such as availability of items to purchase in this example).

Embodiments of the present invention can make use of other systems, such as those that involve a first set of search results and a second set of search results that may be received from the search result providers. Intent features may be extracted from the first set of search results. User intent of the second set of search results may be inferred based on the extracted intent features. The first set of search results and the second set of search results may be ranked based on the inferred user intent.

According to an embodiment of the present invention, intent can be inferred from methods for ranking search results based on a series of attributes derived from the behavior of past searchers. The attributes provide a measure of the relevancy between a search query and a uniform resource locator (URL), file, or other resource based on its relevancy to prior users. This enabling system can comprise an attribute database including a plurality of prior search terms or phases, a first set of resources associated with each of the queries, and the attributes, i.e., metrics, characterizing the relevance of the first set of resources to the queries, and a search processor configured to identify a second set of resources determined to be relevant to a user query. The search processor ranks each of the second set of resources based on the metrics associated with the query and resource, and provides the user with the search results ranked in accordance the metrics and displayed in a manner to increase the utility of the results for the user based on inferred intent. For example, with the increasing popularity of SaaS (software as a service), service providers capture, in real-time, what consumers are doing across an entire visitor session to the Web portal/site/system and how AI agents are engaged to cater for consumer intent. Providers are able to monitor business and technical events that occur during the session, such as customer errors, technology failures, and to predict who and how many others may be affected in future who have the same intent. Analysis of consumer and agent interaction leads to patterns of intent.

According to an embodiment of the present invention, if users are using speech input, the SPS monitor can make use of a speaker intent analysis system and method for validating the truthfulness and intent of a plurality of participants. For example, a SPS monitor analyzes and records the participants' speech parameters for determining a likelihood of honesty. In addition to analyzing participants' speech parameters for distinguishing stress or other abnormalities, the SPS monitor can be equipped with voice recognition software to screen responses that, while not strictly dishonest, are indicative of possible malfeasance on the part of the participants. Once the responses are analyzed, the SPS monitor produces an output that is indicative of the participant's credibility. The output may be sent to proper parties and/or devices such as a web page, computer, e-mail, PDA, pager, database, report, etc. for appropriate action.

According to an embodiment of the present invention, the estimation of intent can be enhanced by including an analysis of any of social network characteristics that include one or more of a degree centrality, between-ness centrality, closeness, eigenvalue, hub and authority, etc.

According to an embodiment of the present invention, intent can have several levels. For example, when a set of people are in an airport waiting to check-in or board there is a high level of intent that the people at an airport want to board the same flight. These levels of intent can be expressed in various ways, for example:

Intent level 1: 20 want to board a plane to France at 1 p.m. local time;

Intent level 2: 3 people want to sit together; and

Intent level 3: 2 people want to sit together and play video games together.

Estimation of more granular levels of intent can be performed on the basis of an individual's history of interactions within a particular context, the individual's interactions within a group (e.g. social network interactions) the individual's preferences (e.g. prefer window seats), the individual's abilities (e.g. have poor eye sight, medical condition, etc.), the individual's resources (e.g. individual's financial status), available resources (e.g., location where intent is being predicted, characteristics of location), and where intent is being predicted.

User preferences can be extracted from recorded historical interactions (e.g., previous flight reservations in past 2 years) or presented explicitly by the individual. Abilities can be inferred from recorded historical interactions (e.g., medical records) or stated explicitly by the individual. Resources can be inferred from documentation (e.g. bank statements, user's location, user's assets etc.) or stated explicitly.

Different aspects can drive intent levels, for example, individual intent versus group/organizational intent. As an individual, a user can have more than two or more competing intents at a given time, and a network of AI agents and users can be employed to resolve conflicts between these different intents. For example, one can query both AI agents and user's social network for more information to derive a fine-grained intent. For example, a user's high-level intent is to accomplish task A (e.g., an evening out). By querying various AI agents and the user's network (e.g., a user's social network), the SPS monitor can infer that task A includes subtasks (e.g., dinner after work), and at the same time refine that intent based on any constraints (e.g., reservation availability, another user's calendar, traffic, etc.). Also, a user may have constraints due to later tasks (e.g., a subsequent task that must be performed early the next day implies that task A is constrained to a one hour).

According to an embodiment of the present invention, a triggered action can include a report, advice (e.g., in text or audio format), an alert in the form of a vibration or sound, etc.

Exemplary Implementations

According to an embodiment of the present invention, the hybrid network can include a social network. The SPS monitor can extract the relationships in the social network using, for example, online social networking services, instant messages, emails, system and event logs, discussions in online discussion bulletin boards, etc. It should be understood that a social network analysis can include an analysis of, for example, content of messages passed in a social network, social network connectivity, timing of messages passed in a social network, the characteristics of users in the social network, analysis tools and systems on which they run, content of messages passed in instant messaging, instant messaging connectivity, etc.

According to an embodiment of the present invention, the method estimates the utility of the response with respect to social networks and network quality (e.g., based on quality of past responses and an impact on the confidence). The SPS monitor monitors the quality of information coming from different members (e.g., AI agents and users), and the information's impact on intent inferencing outcomes. For example, the quality or performance of information from the members can be used to rate the members and evaluate whether to consider (e.g., in time and confidence) their input in future. In an exemplary embodiment of a user having a home calendar that is not always as up-to-date to a work calendar, the SPS monitor rates the work calendar more highly than the home calendar, and can reference the home calendar less often and with a lower confidence if over the time it has shown not to have useful input to the SPS for certain type of intents (e.g. availability for a task).

According to an embodiment of the present invention, the method provides a compute a price, start time and deadline associated with soliciting information with respect to social networks and network depth. It should be understood that social network assessment can include an assessment of characteristics helping to determine the confidence level C including, degree centrality, between-ness centrality, closeness centrality, eigenvalue, hub and authority, etc. In the process of performing such analyses, the SPS can consider questions such as: How highly connected is an entity within a network?; What is an entity's overall importance in a network?; How central is an entity within a network?; and How does information flow within a network?

Figure 4:
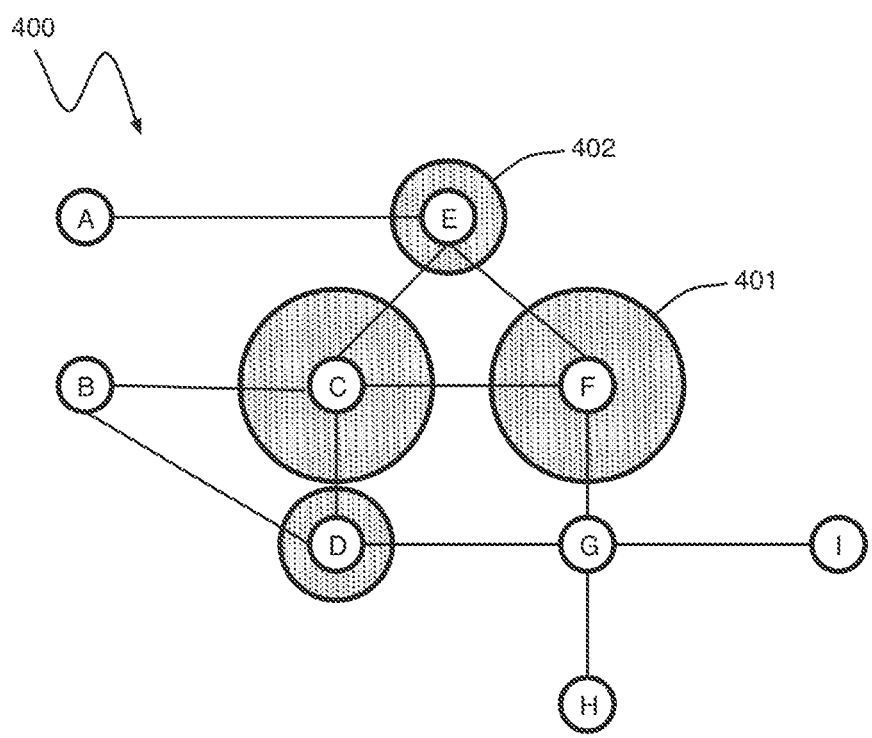
FIG. 4 illustrates an exemplary network having eigenvalues associated with nodes according to an embodiment of the present invention.

In one or more exemplary embodiments, the social network assessment includes the determination of an eigenvalue measuring how close an entity is to other entities within a network. In other words, the eigenvalue identifies the most central entities in terms of the global or overall makeup of the network. A high eigenvalue indicates a member (e.g., user) that is more central to the main pattern of distances among all entities, and is a measure of one aspect of centrality in terms of positional advantage. For example, FIG. 4 illustrates an exemplary network 400 in which nodes C and F have a relatively high eigenvalue as compared to nodes D and E, as indicated by the area of the associated shaded areas (e.g., 401, 402).

According to an embodiment of the present invention, the estimation of intent can be enhanced by an analysis of a degree centrality, between-ness centrality, closeness, etc. These methods extract network indicators tending to identify important vertices within a network graph, e.g., to identify one or more users in a social network that have a large effect on a user in question as compared to still other users in the social network. One of ordinary skill in the art would understand that various methods of extracting indictors from a network can be used and are contemplated herein.

According to an embodiment of the present invention, the estimation of intent can be enhanced by an analysis of a hub and authority network. In a hub and authority network, an entity that many other entities point to is called an authority. If an entity has a high number of relationships pointing to it, it has a high authority value, and generally is a knowledge or organizational authority within a domain and acts as definitive source of information. A hub is an entity that points to a relatively large number of authorities. Hubs are mutually reinforcing analogues to authorities. The authorities point to high hubs. Hubs point to high authorities.

Embodiments of the present invention can be implemented in a variety of fields including for example, active learning. In one exemplary embodiment, the use of social networks to improve an answer confidence in an NLP Q&A system is further restricted to the problem of active learning. Active learning is a special case of semi-supervised machine learning in which a learning algorithm interactively queries a user (or another member of the hybrid network, such as an information source) to obtain the desired outputs at new data points. The use of active learning to enhance NLP Q&A is known in the art and such a learning system can incorporate what is learned by interactively querying a user into the learning system, such that the learning system is better able to address the question or related questions subsequently, without the need for additional interaction. According to an embodiment of the present invention, the social network analysis is used to allow the SPS monitor to interact with a user as a point of contact into a deeper social network where the information the SPS monitor needs is stored. In this way, the SPS monitor can query a user for the information in order to compose an NLP reply to a question posed by the user, and after analyzing the user's social network, suggest how the user may find the required information among members of the social network and thereby reply more effectively to the active learning query.

In the context of a sales environment, a SPS monitor configured according to one or more embodiments of the present invention enables the identification of customer characteristics and behavior, and the prediction of the customer's intent. Such predictions can be used to adopt various business strategies to increase a probability of converting a customer interaction to a sale, increase revenue, and/or enhance the customer's experience.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
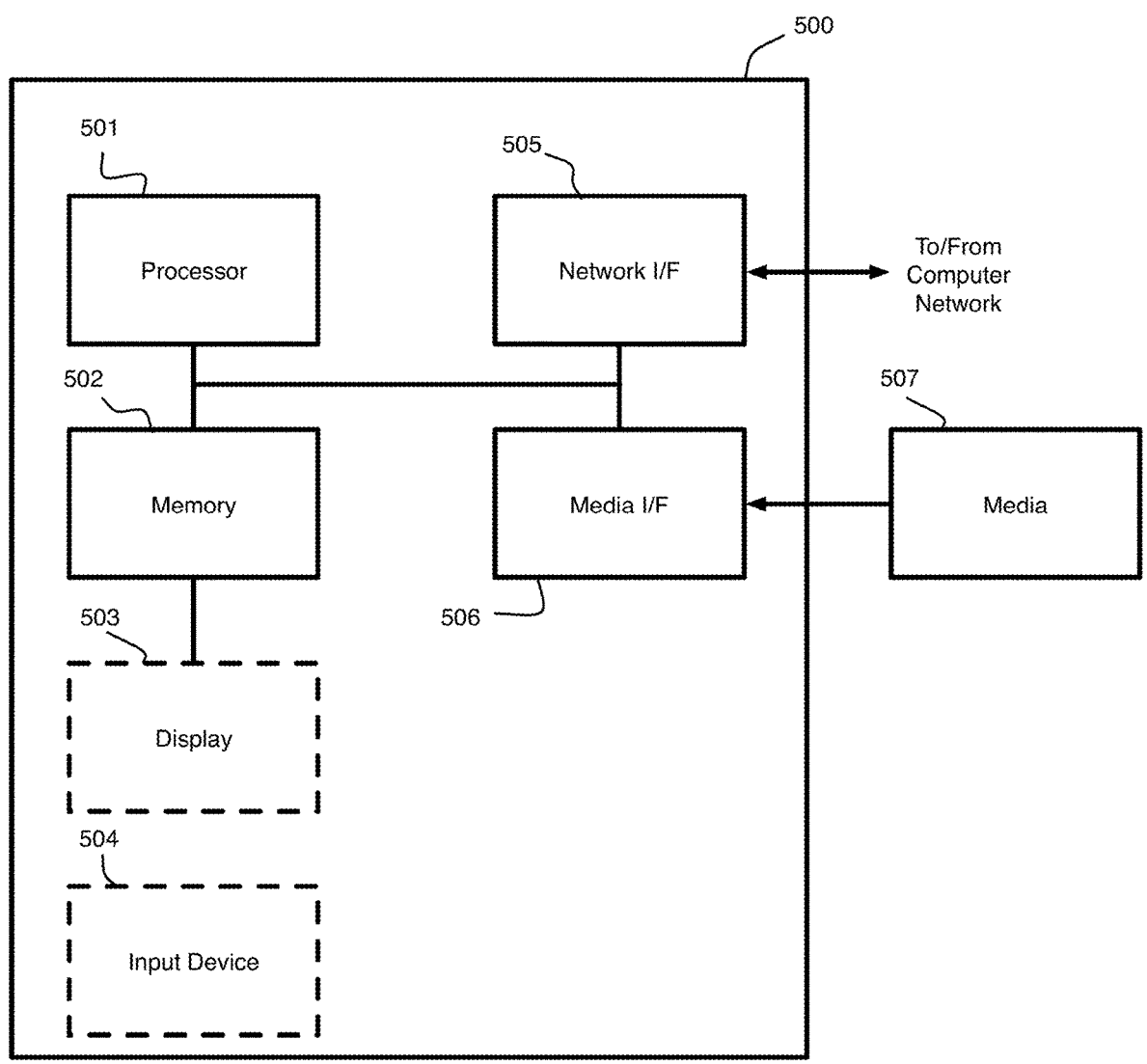
FIG. 5 is a diagram of a computer system configured to infer the intent of members of a social prosthetic system according to an exemplary embodiment of the present disclosure.

For example, FIG. 5 is a block diagram depicting an exemplary computer system 500 (e.g., an SPS monitor 103) for inferring the intent of members of a hybrid network according to an embodiment of the present disclosure. The computer system can be the production system itself including an adaptive system scanner or a stand-alone adaptive system scanner connected to an independent production system. The computer system shown in FIG. 5 includes a processor 501, memory 502, display 503, input device 505 (e.g., keyboard), a network interface (I/F) 505, a media IF 506, and media 507, such as a signal source, e.g., camera, Hard Drive (HD), external memory device, etc.

In different applications, some of the components shown in FIG. 5 can be omitted. The whole system shown in FIG. 5 is controlled by computer readable instructions, which are generally stored in the media 507. The software can be downloaded from a network (not shown in the figures), stored in the media 507. Alternatively, a software downloaded from a network can be loaded into the memory 502 and executed by the processor 501 so as to complete the function determined by the software.

The processor 501 may be configured to perform one or more methodologies described in the present disclosure, illustrative embodiments of which are shown in the above figures and described herein. Embodiments of the present disclosure can be implemented as a routine that is stored in memory 502 and executed by the processor 501 to process the signal from the media 507. As such, the computer system is a general-purpose computer system that becomes a specific purpose computer system when executing the routine of the present disclosure.

Although the computer system described in FIG. 5 can support methods according to the present disclosure, this system is only one example of a computer system. Those skilled of the art should understand that other computer system designs can be used to implement the present invention.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A system comprising:
a hybrid network comprising a plurality of members, each of the members associated with a respective portable device and at least one artificial intelligence agent having a natural language processing capability and disposed on a remote computer, wherein the at least one artificial intelligence agent provides a plurality of query responses to the portable devices; and
a social prosthetic system monitor executing on a device remote from the at least one artificial intelligence agent and configured to monitor information from the members of the hybrid network and associate the members of the hybrid network by a dimension of intent, wherein the social prosthetic system estimates an intent of the hybrid network, wherein the monitoring of the information includes monitoring a query made by a first member of the plurality of members using a respective one of the portable devices to the at least one artificial intelligence agent, estimating an intent of the first member from the information and the intent of the hybrid network, and triggering a ranking of a plurality of new query responses responsive to the query made by the first member, the ranking of the plurality of query responses being performed using the intent of the hybrid network and the intent of the first member, wherein the plurality of query responses are provided to the respective one of the portable devices according to the ranking.

2. The system of claim 1, wherein the social prosthetic system monitor interfaces with a social network of the members to retrieve at least a portion of the information, and determines at least one constraint on the query made by the first member using the information.

3. The system of claim 1, wherein estimating the intent of the hybrid network includes identifying relationships between the members.

4. A method of inferring intent in a hybrid network comprising:
monitoring communications, by a social prosthetic system monitor, in the hybrid network between a plurality of members, wherein the members are associated with respective portable devices, and at least one artificial intelligence agent having a natural language processing capability and disposed on a remote computer, and wherein the monitoring of the communications includes monitoring a query made by a first member of the plurality of members using a respective one of the portable devices to the at least one artificial intelligence agent;
obtaining a plurality of responses to the query made by the first member from the at least one artificial intelligence agent;
triggering an estimation of an intent of the hybrid network, wherein the estimation of the intent is triggered by a parameter of the first member of hybrid network recorded by the social prosthetic system monitor;
estimating the intent of the hybrid network using at least one of the communications and the parameter; and
determining a confidence level of the plurality of responses to the query, wherein the confidence level triggers a ranking of the plurality of responses using the intent of the hybrid network, wherein the plurality of responses and the ranking are output to the respective one of the portable devices.

5. The method of claim 4, wherein the social prosthetic system monitor interfaces with a social network of the members to retrieve at least a portion of the information, and determines at least one constraint on the query made by the first member using the information.

6. The method of claim 4, further comprising:
determining a prediction of an output of the at least one artificial intelligence agent by the social prosthetic system monitor upon estimating a cost of the output is higher than a threshold cost, and wherein the output is the plurality of responses; and
providing the prediction to the at least one of the portable devices prior to obtaining the plurality of responses from the at least one artificial intelligence agent.

7. The method of claim 4, wherein estimating the intent of the hybrid network includes identifying relationships between the members.

8. The method of claim 4, wherein the parameter of the first member is a degree to which members of the hybrid network affect one another.

9. The method of claim 4, the parameter of the first member is a connection within the hybrid network between the members.

10. The method of claim 4, wherein the estimation of intent includes an analysis of a social network to which the members, including the first member, belong, the analysis determining one or more of a degree centrality, a betweenness centrality, a closeness, and an eigenvalue.

11. The method of claim 4, further comprising:
identifying the first member as a customer;
estimating an intent of the customer; and
updating a business practice using the intent of the customer and the of the hybrid network.

12. The method of claim 4, wherein obtaining the plurality of responses to the query from the at least one artificial intelligence agent comprises obtaining the plurality of responses from two or more artificial intelligence agents.

13. The method of claim 4, further comprising determining that the confidence level of the plurality of responses to the query is less than a threshold, wherein the comparison triggers the ranking, by the social prosthetic system monitor, of the plurality of responses using the intent of the hybrid network.

14. A computer program product for inferring intent in a hybrid network, the computer program product comprising a computer readable storage medium having program instructions embodied therewith, the program instructions executable by a processor to cause the processor to perform a method comprising:
monitoring communications, by a social prosthetic system monitor, in the hybrid network between a plurality of members, wherein the members are associated with respective portable devices, and at least one artificial intelligence agent having a natural language processing capability and disposed on a remote computer, and wherein the monitoring of the communications includes monitoring a query made by a first member of the plurality of members using a respective one of the portable devices to the at least one artificial intelligence agent;
obtaining a plurality of responses to the query made by the first member from the at least one artificial intelligence agent;
triggering an estimation of an intent of the hybrid network, wherein the estimation of the intent is triggered by a parameter of the first member of hybrid network recorded by the social prosthetic system monitor;
estimating the intent of the hybrid network using at least one of the communications and the parameter; and
determining a confidence level of the plurality of responses to the query, wherein the confidence level triggers a ranking of the plurality of responses using the intent of the hybrid network, wherein the plurality of responses and the ranking are output to the respective one of the portable devices.

15. The computer program product of claim 14, further comprising:
determining a prediction of an output of the at least one artificial intelligence agent by the social prosthetic system monitor upon estimating a cost of the output is higher than a threshold cost, and wherein the output is the plurality of responses; and
providing the prediction to the at least one of the portable devices prior to obtaining the plurality of responses from the at least one artificial intelligence agent.

16. The computer program product of claim 14, wherein estimating the intent of the hybrid network includes identifying relationships between the members.

17. The computer program product of claim 14, the parameter is a degree to which members of the hybrid network affect one another.

18. The computer program product of claim 14, wherein the parameter is a connection within the hybrid network between the members.

19. The computer program product of claim 14, wherein obtaining the plurality of responses to the query from the at least one artificial intelligence agent comprises obtaining the plurality of responses from two or more artificial intelligence agents.

20. The computer program product of claim 14, further comprising determining that the confidence level of the plurality of responses to the query is less than a threshold, wherein the comparison triggers the ranking, by the social prosthetic system monitor, of the plurality of responses using the intent of the hybrid network.

* * * * *